United States Patent [19]

Angevine et al.

[11] Patent Number: 4,834,869

[45] Date of Patent: May 30, 1989

[54] RESID UPGRADING PROCESS

[75] Inventors: Philip J. Angevine; Pochen Chu, both of West Deptford, N.J.; Thomas F. Degnan, Yardley, Pa.; Garry W. Kirker, Washington Township, N.J.

[73] Assignee: Mobil Oil Corp., New York, N.Y.

[21] Appl. No.: 161,693

[22] Filed: Feb. 29, 1988

Related U.S. Application Data

[62] Division of Ser. No. 938,476, Dec. 5, 1986, Pat. No. 4,743,572.

[51] Int. Cl.$^4$ ............................................. C10G 45/04
[52] U.S. Cl. ..................... 208/213; 208/216 PP; 208/217; 208/216 R; 208/251 H; 208/254 H; 208/112; 208/299; 208/300; 502/65; 502/164
[58] Field of Search .......... 208/251 H, 216 R, 254 H; 502/65, 164

[56] References Cited

U.S. PATENT DOCUMENTS

| | | | |
|---|---|---|---|
| 3,904,550 | 9/1975 | Pine | 252/437 |
| 4,158,621 | 4/1979 | Swift et al. | 208/231 R |
| 4,179,358 | 12/1979 | Swift et al. | 208/114 |
| 4,210,560 | 7/1980 | Kehl | 252/437 |
| 4,222,896 | 9/1980 | Swift et al. | 502/65 |
| 4,228,036 | 10/1980 | Swift et al. | 252/437 |
| 4,363,748 | 12/1982 | Crum et al. | 252/437 |
| 4,376,067 | 3/1983 | Vogel et al. | 252/437 |
| 4,382,877 | 5/1983 | Kehl | 252/437 |
| 4,382,878 | 5/1983 | Kehl | 252/437 |
| 4,407,732 | 10/1983 | Kehl | 502/208 |
| 4,650,564 | 3/1987 | Occelli | 208/113 |
| 4,670,134 | 6/1987 | Kolts et al. | 208/251 H |
| 4,743,572 | 5/1988 | Angevine et al. | 502/164 |

FOREIGN PATENT DOCUMENTS

31365/84 8/1984 Australia .

*Primary Examiner*—Patrick P. Garvin
*Assistant Examiner*—Helane Myers
*Attorney, Agent, or Firm*—Alexander J. McKillop; Charles J. Speciale; Dennis P. Santini

[57] ABSTRACT

This invention relates to a method of preparing a metal-containing amorphous magnesia-alumina-aluminum phosphate catalyst support involving the admixture of an organic cation having a size equal to or greater than 2 Angstroms, the organic cation preferably being a tertiary or a tetraalkylammonium or phosphonium cation. The method permits recovery of a catalyst support having a controlled pore size distribution. The invention also relates to an improved catalytic support as well as an improved petroleum residua upgrading process comprising hydrotreating residua in the presence of the improved catalyst support.

20 Claims, No Drawings

RESID UPGRADING PROCESS

CROSS-REFERENCE TO RELATED APPLICATION

This a division of application Ser. No. 938,476, filed Dec. 5, 1986, now U.S. Pat. No. 4,743,572.

This application is related by subject matter to application Ser. No. 50,446, filed May 18, 1987, and application Ser. No. 50,445, filed May 18, 1987, now U.S. Pat. No. 4,767,733.

BACKGROUND OF THE INVENTION

1. Field of the Invention

This invention is directed to an improved petroleum residua upgrading process comprising the hydrotreatment of resids in the presence of metal containing amorphous magnesia-alumina-aluminum phosphate catalyst. The invention also relates to the catalyst used in the process.

2. Background Art

It is well known that many if not most petroleum based stocks contain contaminants as for example, sulfur, nitrogen and metals. It is desirable, particularly if these feedstocks are to be further processed, that the contaminants be removed. This is an operation usually requiring use of a catalyst.

It has been conventional in the art to effect contaminant removal, such as sulfur removal from hydrocarbon stocks, by subjecting them to treatment with hydrogen at elevated temperature and pressure while in contact with a catalyst containing hydrogenating components. Typically the hydrogenating components of such known catalysts are Group VIB or VIII metals, or other oxides or sulfides. These hydrogenating components may be supported on a variety of well known carriers, for example, alumina, kiselguhr, zeolitic molecular sieves and other materials having high surface areas: U.S. Pat. No. 4,080,296. U.S. Pat. No. 3,546,103 teaches hydrodesulfurization with a catalyst of cobalt and molybdenum on an alumina base. U.S. Pat. No. 3,755,146 describes a process for preparing lube oils characterized by low pour points which utilizes a catalyst mixture comprising hydrogenation components, a conventional cracking catalyst which can be either crystalline or amorphous and a crystalline aluminosilicate of the ZSM-5 type.

Hydrotreating of distillates may be defined simply as removal of sulfur, nitrogen and metal compounds by selective hydrogenation. The hydrotreating catalysts used commercially are cobalt plus molybdenum or nickel plus molybdenum used in the sulfided forms and impregnated on an alumina base. The hydrotreating operating conditions are such that appreciable hydrogenation of aromatics does not occur; these are about 1000 to 2000 psi hydrogen and about 700° F. The theoretical hydrogen consumption should be that required to hydrogenate the sulfur, nitrogen and metal-containing molecules and produce hydrogen sulfide and ammonia. However, the desulfurization reactions are invariably accompanied by small amounts of hydrogenation and hydrocracking, the extent of which depends on the nature of the feedstock and the severity of desulfurization.

This invention relates to a petroleum residua upgrading process. It comprises hydrotreatment of atmospheric or vacuum resids in the presence of a catalyst. The catalyst is a metal-containing amorphous magnesia-alumina-aluminum phosphate (MAAP).

The synthesis and use of similar compounds as supports for cracking and hydrocracking catalysts have been described in U.S. Pat. Nos. 4,179,358; 4,210,560; and 4,376,067, which are hereby incorporated by reference. More particularly, amorphous catalytic supports consisting of magnesia-alumina-aluminum phosphate are disclosed in U.S. Pat. No. 4,210,560, which is hereby incorporated by reference. U.S. Pat. No. 4,376,067 is a related patent disclosing substitution of a Group IIB component consisting of zinc or cadmium for magnesium. These supports are prepared by mixing together aqueous solutions of magnesium nitrate, aluminum nitrate and phosphoric acid and precipitating with ammonium hydroxide at a pH of about 9.0.

U.S. Pat. Nos. 4,382,877 and 4,382,878 also describe the use of MAAP-based catalysts. These patents are hereby incorporated by reference.

The above patents relate to the use of MAAP-based catalysts for hydrotreating. They describe advantages for lowering nitrogen and sulfur content of hydrogen feedstocks, but did not affect metals removal. Regarding certain of the FCC-related patents, there is description of advantages of MAAP FCC catalyst with regard to metals tolerance.

The importance of pore size distribution in catalyst or catalyst carrier is taught in U.S. Pat. No. 4,328,127.

However, neither the prior art mentioned above nor any known to applicants relate to the use of an organically-modified MAAP, exclusive of a cracking component, for demetallization and desulfurization of resids. It is only applicants who have discovered hydrodemetallization advantages obtained through use of organically-modified MAAPs. Moreover, the pore size distribution of applicants' material is distinctively different than previous MAAPs. This being achieved through applicants' discovery relating to the use of organic precipitating agents in the preparation of magnesia-alumina-aluminum phosphate supports. Applicants have further discovered that the pore size distribution of an amorphous material can be tailored by using organic compounds. Applicants have further discovered that by varying the type of and amount of organic present in the MAAP catalyst that the pore size distribution can be modified and certain pore diameter populations can be enhanced. All this is neither disclosed nor suggested in the art. With this in mind, applicants will proceed with a summary of the novel features of the present invention.

SUMMARY OF THE INVENTION

This invention relates to an improved petroleum residua upgrading process comprising hydrotreatment of atmospheric or vacuum resids in the presence of a metal-containing amorphous magnesia-alumina-aluminum phosphate catalyst. Applicants have disclosed that by replacing some or all of the ammonium hydroxide with alkyl amines or quarternary alkyl ammonium hydroxide in prior processes used for making MAAP catalyst that the pore size distribution of these supports can be advantageously shifted to be more effective for catalytic uses. The pore size distribution of the organically modified support is distinctly different from known MAAP materials. These materials have been found to have advantageous hydrodemetallization characteristics in addition to the mentioned enhancement of certain pore size populations.

This invention further relates to a method of preparing a metal oxide-alumina-aluminum phosphate catalyst support having a controlled pore size distribution comprising the steps of:

(a) forming an aqueous solution of aluminum, other divalent metal and phosphoric acid with agitaton;

(b) admixing the solution of step (a) with a source of organic cation having a size equal to or larger than 2 Angstroms;

(c) precipitating said admixture; and (d) recovering the metal oxide-alumina-aluminum phosphate catalyst support so produced.

The invention relates to a method of preparing an amorphous metal-containing metal oxide-alumina-aluminum phosphate catalyst support comprising the steps of:

(a) forming an aqueous solution of aluminum, other divalent metal and phosphoric acid with agitation;

(b) admixing the solution of step (a) with a source of organic cation having a size equal to or larger than 2 Angstroms, the source of organic cation being an amine derivative, R$_4$NX or R$_4$PX with at least one alkyl group, X being hydroxide or halide and R being hydrogen or an alkyl group;

(c) precipitating said admixture;

(d) incorporating a Group VIII metal of the Periodic Table of Elements in the support of step (c); and (e) recovering the amorphous metal-containing metal oxide-alumina-aluminum phosphate catalyst support having a controlled pore size distribution.

The invention further relates to an improved catalyst support comprising a metal oxide-alumina-aluminum phosphate matrix, having controlled pore size distribution, containing in its internal pores an organic cation having a size equal to or greater than 2 Angstroms.

The invention also relates to an improved catalyst support comprising an amorphous metal-containing magensia-alumina-aluminum phosphate matrix, having controlled pore size distribution, containing in its internal pores an organic cation having a size equal to or greater than 2 Angstroms, the organic cation being a tertiary or tetraalkylammonium or phosphonium cation.

The invention also relates to an improved petroleum residua upgrading process comprising hydrotreating residua in the presence of a metal-containing amorphous metal oxide-alumina-aluminum phosphate catalyst comprising a metal oxide-alumina-aluminum phosphate matrix, having controlled pore size distribution, containing in its internal pores an organic cation having a size equal to or greater than 2 Angstroms.

The invention relates to an improved petroleum residua upgrading process comprising hydrotreating residua in the presence of a metal-containing amorphous magnesia-alumina-aluminum phosphate matrix, having a controlled pore size distribution, containing in its internal pores an organic cation having a size equal to or greater than 2 Angstroms, the organic cation being a tertiary or tetraalkylammonium or phosphonium cation.

DESCRIPTION OF EMBODIMENTS

This invention resides in catalytic supports and a method for preparing them. The supports herein are used in hydrotreating processes.

The catalyst support herein is an organically modified magnesia-alumina-aluminum phosphate matrix of the formula:

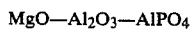

$MgO$—$Al_2O_3$—$AlPO_4$

An unmodified support is generally described in U.S. Pat. No. 4,210,560. Normally, the magnesia-alumina-aluminum phosphate constituents are in a mole percent ratio range of from about 10:80:10 to about 25:10:65, preferably from about 10:55:35 to about 20:35:45.

The magnesia-alumina-aluminum phosphate matrix is characterized after calcination at 500° C. for 10 hours, as amorphous and having an average pore radius of from about 10A to about 200A, preferably from about 75A to about 150A; a surface area ranging from about 100 m$^2$/g to about 350 m$^2$/g, preferably from about 125 m$^2$/g to about 250 m$^2$/g and a pore volume of from about 0.3 cc/g to about 1.5 cc/g, preferably from about 0.7 cc/g to about 1.2 cc/g; and wherein said matrix retains at least 90% of its surface area when the matrix is additionally calcined at a temperature up to about 750° C. for about 10 hours.

The magnesia-alumina-aluminum phosphate catalyst supports are prepared by admixing together an aqueous solution of aluminum nitrate with an aqueous solution of magnesium nitrate and 85% phosphoric acid. The magnesia-alumina-aluminum phosphate catalyst support is precipitated from solution by the addition of alkylamines or quaternary alkyl-ammonium hydroxide whose cation has a size equal to or greater than 2A with or without ammonium hydroxide. Normally, the solution pH is maintained at or about 9.0, however, the pH can be initially about 7.5 and slowly raised to pH 9.5 as the reaction proceeds.

Aluminum nitrate is prepared by adding nitric acid to aluminum and crystalizing the resultant aluminum nitrate from solutions. Similarly, magnesium nitrate is prepared by adding nitric acid to magnesium oxide and crystalizing the resultant magnesium nitrate from solution. Of course, commercial sources of these nitrates are available and can be used.

After the magensia-alumina-aluminum phosphate matrix is filtered from solution, it is dried at about 120° C. and calcined at about 500° C. for about 10 hours using conventional apparatus. The resulting matrix after calcination is amorphous.

Regarding the incorporation of metal components into the magnesia-alumina-aluminum phosphate, it can be done in any manner known to those skilled in the art. For example, CoMo and Mo magnesia-alumina-aluminum phosphates can be prepared by room temperature impregnation of soluble cobalt and molybdenum salts followed by drying and air calcination at 800°20 F. for three hours. It is also possible to include metals by co-precipitation. The metal components are preferably Co, Mo, Ni or W or mixtures thereof. Generally, any of the Group VIII metals of the Periodic Table of Elements can be used. The inclusion of such metals is critical to the hydrodemetallization effectiveness of the catalysts.

As mentioned, one of the novel features of this invention relates to the admixture of a source of organic cation having a size equal to or larger than 2 Angstroms with an aqueous solution of aluminum, magnesium and phosphoric acid. The hydroxide compound has a cation of 2 Angstroms or larger. The hydroxide compound can be an amine derivative, dialkylammonium, trialkylammonium, a tetraalkylquaternary ammonium compound, for example, tetramethylammonium hydroxide, tetraethyammonium hydroxide, tetrapropylammonium hydroxide or tetrabutylammonium hydroxide. Analogous phosphonium compounds can also be utilized, for example, tetramethylphosphonium hydroxide, tetraethylphosphonium hydroxide, tetrapropylphosphonium hydroxide or tetrabutylphosphonium hydroxide.

Not only can the anion be a hydroxide, but it can also be a halide such as chlorine or bromine anion as well as other suitable anions. Thus, a general formulization for the organic compound is $R_4NOH$ or $R_4NX$ where X is a hydroxide or halide anion or other suitable anion. R includes hydrogen or alkyl groups.

Thus, modified amorphous catalytic supports with controlled pore size distributions are prepared by precipitation of phosphoric acid solutions of aluminum and magnesium using alkyl amines of quaternary ammonium hydroxide with or without ammonium hydroxide. The use of organic amines provides a method of introducing unique preferred large pores into the supports. By replacing some or all of the ammonium hydroxide with alkyl amines or quaternary ammonium hydroxide, the pore size distribution of these supports can be advantageously shifted to be more effective for catalytic and absorptive uses. These large pore materials are useful for preparation of catalyst for hydrodemetallization of resids.

The metal oxide-alumina-aluminum-phosphate catalyst support preferably contains magnesia. However, other known metal oxides can also be used.

Due to the need for wide pore materials for processing resids, the disclosed method of preparation constitutes a valuable contribution to the art. Applicants have discovered that by varying the type of and amount of organic present, they can modify the pore size distribution and specifically enhance certain pore diameter populations. A more particularized description of the invention follows:

EXAMPLES

The concept disclosed here involves preparation of metal-$MgO$—$Al_2O_3$—$AlPO_4$ materials with a templating organic ion being present during precipitation. This is achieved with the organic compounds mentioned above. By controlling precipitating time, temperature and pH, applicants have discovered the ability to vary the pore size distribution of the support by adding an organic templating ion. It is possible to modify the pore size distribution. This is shown by the following experiments.

A base preparation of $MgO$—$Al_2O_3$—$AlPO_4$ amorphous support was carried out. Aqueous solutions of aluminum nitrate and magnesium nitrate were combined with a solution of phosphoric acid. Separately, a basic aqueous solution of ammonia and a quaternary ammonium hydroxide or just a basic amine is prepared. The two solutions are simultaneously added to a beaker containing distilled water as a reacting medium and neutralized at a constant pH of 9.0 by careful control of the rates of addition. The precipitate obtained is filtered, washed, dried and then calcined at 538° C. for up to 6 hours.

Again, the Group VIII metals or preferably Co, Mo, Ni, W are added using methods known to those skilled in the art, for example, using impregnation techniques with solutions containing the desired metal components.

In Table 1, the results of eight preparations are compared demonstrating that the organic amine or organic ammonium ion profoundly affects pore size distribution. This ability to vary pore size distribution is desirable. The term "organic" indicates either that the particular material was prepared according to the procedures set forth in this patent (with organic) or that it was prepared according to prior art techniques (without organics) mentioned above.

TABLE 1

| Example | 1 | 2 | 3 | 4 | 5 |
|---|---|---|---|---|---|
| Moles, MgO | 0.20 | 0.05 | 0.05 | 0.05 | 0.05 |
| Moles, $Al_2O_3$ | 0.29 | 0.25 | 0.25 | 0.25 | 0.25 |
| Moles, $P_2O_5$ | 0.09 | 0.13 | 0.13 | 0.13 | 0.13 |
| Moles $NH_4OH$ | 3.5 | 2.3 | 2.7 | 2.4 | 1.9 |
| Moles Organic | 0 | 0.05[1] | 0.25[2] | 0.22[3] | 0.18[2] |
| pH | 9.0 | 9.0 | 9.0 | 9.0 | 9.0 |
| Calcination Conditions | 1000° F. in air for 3 hrs. | ← 1000° F. in $N_2$ for 3 hrs. → | | | |
| | — | ← 1000° F. in air for 3 hrs. → | | | |
| BET Surface Area | | | | | |
| Surface Area $m^2/g$ | 190 | 162 | 158 | 159 | 160 |
| Pore vol, cc/g | 1.07 | 0.75 | 0.96 | 0.93 | 0.94 |
| Pore Size Dist. Pore Size, A Vol % | | | | | |
| 30 | 0.9 | 0.2 | 0.0 | 0.0 | 0.1 |
| 30–50 | 3.8 | 1.4 | 0.5 | 0.4 | 0.7 |
| 50–100 | 11.1 | 10.6 | 4.8 | 5.0 | 4.5 |
| 100–150 | 12.1 | 22.1 | 12.5 | 13.1 | 11.9 |
| 150–200 | 11.4 | 22.6 | 17.6 | 19.2 | 17.0 |
| 200–400 | 37.4 | 38.6 | 59.4 | 58.5 | 60.8 |
| 400–600 | 23.3 | 4.5 | 5.3 | 3.8 | 5.0 |
| Sorptions, Wt % | | | | | |
| $H_2O$ | 15.2 | 13.6 | 12.1 | 12.3 | 11.4 |
| Cyclo-$C_6$ | 10.2 | 4.5 | 3.9 | 4.3 | 4.5 |
| Normal-$C_6$ | 6.3 | 4.2 | 3.7 | 3.5 | 5.1 |

| Example | 6 | 7 | 8 | 9 |
|---|---|---|---|---|
| Moles, MgO | 0.05 | 0.026 | 0.05 | 0.05 |
| Moles, $Al_2O_3$ | 0.25 | 0.12 | 0.25 | 0.25 |
| Moles, $P_2O_5$ | 0.13 | 0.065 | 0.13 | 0.13 |
| Moles $NH_4OH$ | 0 | 0 | 0 | 3 |
| Moles Organic | 1.6[2] | 4 | 2.3[5] | 0 |
| pH | 9.0 | 9.0 | 9.0 | 9.0 |
| Calcination Conditions | ← 1000° F. in $N_2$ for 3 hrs. → | | | |
| | T3-1000° F. in air for 3 hours | 1000° F. in air for 6 hours | 1000° F. in air for 3 hours | |
| BET Surface Area | | | | |
| Surface Area $m^2/g$ | 108 | 444 | 156 | 131 |
| Pore vol, cc/g | 1.11 | 0.43 | 0.95 | 0.94 |
| Pore Size Dist. Pore Size, A Vol % | | | | |
| 30 | 0.1 | 17.5 | 0.8 | 0.0 |
| 30–50 | 0.1 | 49.2 | 1.5 | 0.0 |
| 50–100 | 1.7 | 32.8 | 6.3 | 2.5 |
| 100–150 | 4.4 | 0.3 | 11.4 | 7.4 |
| 150–200 | 4.6 | 0.1 | 15.3 | 12.8 |
| 200–400 | 35.3 | 0.0 | 62.2 | 61.6 |
| 400–600 | 53.8 | 0.0 | 2.5 | 15.7 |
| Sorptions, Wt % | | | | |
| $H_2O$ | 8.9 | 32.0 | 17.3 | 9.9 |
| Cyclo-$C_6$ | 3.3 | 19.4 | 6.5 | 3.6 |
| Normal-$C_6$ | 3.0 | 15.2 | 5.8 | 3.7 |

[1]Tetrapropylammonium hydroxide
[2]Tetramethylammonium hydroxide
[3]Tetraethylammonium hydroxide
[4]211 g of 50% aqueous solution of polyethyleneimine
[5]n-propylamine Thus, these results show that the subject technique permits a person of ordinary skill in the art to tailor or control pore size distribution, which is a valuable technique useful in the preparation of catalytic materials. Such amorphous $MgO$—$Al_2O_3$—$AlPO_4$ support materials are tested below for hydrodemetallization of resids.

The following experiments show results of using a porous support magnesia-alumina-aluminum phosphate in a resid hydrotreating catalyst to have superior activity for demetallization and asphaltene conversion compared to its alumina supported counterpart. The information describes an improved catalytic process for upgrading resid. In particular, catalytic tests with petroleum residua have shown that a novel porous support, magnesia-alumina-aluminum phosphate, yields a catalyst having 70°–100° F. higher initial activity for demetallization and asphaltene removal than known commercial catalysts. Catalysts of this type permit reduction in the cost of hydroprocessing resid. The large pore volume of the catalyst of the present invention (1.0 vs. 0.5 cubic centimeters per gram for conventional catalyst) suggests large metals capacity permitting long term aging characteristics, an additional advantageous feature of the catalyst support.

The following experiments relate to an improved petroleum residua upgrading process comprising the hydrotreatment of atmospheric or vacuum resids in the presence of a metal-containing amorphous magnesia-alumina-aluminum phosphate catalyst. Preferred metals are shown to be cobalt, molybdenum, nickel, tungsten, alone or in combination with each other. The process is carried out in a conventional fixed bed downflow (trickle bed) reactor at hydrogen partial pressures greater than 400 psig, temperatures ranging from 675° to 850° F. and liquid hourly space velocity between 0.1 and 10 hrs$^{-1}$.

As mentioned above, the synthesis and use of similar compounds as supports for cracking and hydrocracking catalyst have been described in certain United States patents. The use of these materials, exclusive of the cracking component, for demetallization and desulfurization of resids is new. Furthermore, the pore size distribution of this material is distinctly different than previous magnesia-alumina-aluminum phosphate supports.

Three supported metal amorphous MAAP catalysts were evaluated for the metals, sulfur, CCR, and asphaltene removal on shaker bomb experiments with Arab Light vacuum resid. Shaker bomb testing has been shown to very closely simulate the resid upgrading activities observed in continuous downflow units. See S. M. Oleck and H. S. Sherry, *Fresh Water Manganese Nodules As A Catalyst For Demetallizing and Desulfurizing Petroleum Residua*, Ind. Eng. Chem., Process Des. Dev., 16 (4) 525 (1977) which is hereby incorporated by reference. Properties of these catalysts are shown in Table 2 while properties of the Arab Light vacuum resid are shown in Table 3.

TABLE 2

Properties of the Supported Metal Amorphous Magnesia-Alumina-Aluminum Phosphate Catalysts

|  | Mo/MAAP | CoMo/MAAP | NiW/MAAP |
|---|---|---|---|
| Density, g/cc |  |  |  |
| Packed | 0.877 |  |  |
| Real | 2.533 |  |  |
| Pore Vol, cc/g | 0.745 | 0.962 | 0.94 |
| Surface Area, m$^2$/g | 100 | 111 | 65 |
| Avg. Pore Dia., A | 300 | 243 | 240 |
| Pore Size Distribution,* |  |  |  |
| Pore Volume in Pores of |  |  |  |
| 0–30 A | 12 | 32 | — |
| 30–50 A | 1 | — | 1 |
| 50–80 A | 1 | — | 1 |
| 80–100 A | 1 | 1 | 3 |
| 100–150 A | 5 | 8 | 12 |
| 150–200 A | 12 | 17 | 17 |
| 200–300 A | 39 | 28 | 51 |
| 300 + A | 29 | 14 | 15 |
| Sodium, ppm | 100 | 3.0 |  |

TABLE 2-continued

Properties of the Supported Metal Amorphous Magnesia-Alumina-Aluminum Phosphate Catalysts

|  | Mo/MAAP | CoMo/MAAP | NiW/MAAP |
|---|---|---|---|
| Iron, ppm | 100 |  |  |
| Vanadium, ppm | 20 |  |  |
| Nickel, wt % | 0.0040 |  | 2.8 |
| SiO$_2$, wt % | 1.2 |  |  |
| Al$_2$O$_3$, wt % | 49.6 |  |  |
| CoO, wt % | — | 3.0 |  |
| MoO$_3$, wt % | 8.0 | 11.0 |  |
| TiO$_2$, wt |  |  |  |
| P$_2$P$_3$ |  |  | 31.7 |
| W, wt % |  |  |  |
| Sorption Capcity, wt % |  |  |  |
| H$_2$O | 17.3 | 12.1 | 11.4 |
| Cyclohexane | 6.5 | 3.9 | 4.5 |
| Hexane | 5.8 | 3.7 | 5.1 |
| Form | 14/30 Mesh | 14/30 Mesh | 14/30 Mesh |

*Properties on final catalyst.

TABLE 3

Properties of the Arab Light Vacuum Resid

| Elemental Analysis (wt %) |  |
|---|---|
| Hydrogen | 10.68 |
| Sulfur | 3.93 |
| Nitrogen | .31 |
| CCR | 16.96 |
| Asphaltenes (normal-C$_5$) | 10.93 |
| Metals Analysis (ppm) |  |
| Nickel | 16 |
| Vanadium | 65 |
| Iron | 12 |
| Sodium | 6 |
| Kinematic Viscosity (cs) |  |
| 212° F. | 496.2 |
| 300° F. | 24.6 |

These catalysts were contacted with oil in a conventional shaker bomb apparatus at the following conditions:

| Oil:Catalyst (wt:wt) | 20 |
|---|---|
| Temperature, °C. | 400 |
| H$_2$ Pressure, psig | 2000 |
| Reaction Time, min | 80 |

A conventional apparatus is shown in J. W. Payne, C. W. Streed, and E. R. Kent, *The Shaker Bomb-A New Laboratory Tool For Studying Thermal Processes*, Ind. Eng. Chem., 50 (1), 47 (1958), hereby incorporated by reference. Following each run, the catalyst and the oil are separated and both components are analyzed. The effectiveness of each catalyst for resid upgrading is determined by comparing the degree of demetallization, desulfurization, CCR removal and the like to that observed in an indentical run in which a conventional resid hydrotreating (CoMo/Al$_2$O$_3$) catalyst is used. Properties of the CoMo/Al$_2$O$_3$ catalyst are set forth in Table 4.

TABLE 4

CoMo/Al$_2$O$_3$Resid Demetallization Catalyst Properties

| Metals Loading (wt %) |  |
|---|---|
| CoO | 3.5 |
| MoO$_3$ | 10.0 |
| Physical Properties |  |
| Surface Area, m$^2$/g | 109 |
| Real Density, g/cc | 3.629 |
| Particle Density, g/cc | 1.221 |
| Pore Volume, cc/g | 0.543 |
| Avg. Pore Dia, A | 199 |
| Pore Size Distribution, % |  |
| Pore Volume in Pores of |  |
| 0–30 A Diameter | 11 |

TABLE 5

Comparison of Resid Upgrading Activities

| | Example 10 Thermal | Example 11 CoMo/Al$_2$O$_3$ | Example 12 Mo/MAAP | Example 13 CoMo/MAAP | Example 14 NiW/MAAP | Example 15 Mo/MAAP |
|---|---|---|---|---|---|---|
| Cat Mesh Size | — | 1/32" extrudate | 14–30 | 14–30 | 14–30 | 8/20 |
| Organic Conditions | | No | Yes | Yes | Yes | No |
| Temp., °C. | 400 | → | → | → | → | → |
| Press., psig | 2000 | → | → | → | → | → |
| Oil/Cat | — | 20 | → | → | → | → |
| Time, Min. | 80 | → | → | → | → | → |
| Conv. to 1000° F., % | 13 | 14.7 | 12.3 | — | — | — |
| Total Liquid Product Analysis | | | | | | |
| Hydrogen, wt % | 10.58 | 10.69 | 10.75 | 10.90 | 10.11 | 11.03 |
| Sulfur, wt. % | 3.47 | 2.52 | 3.48 | 2.37 | 3.00 | 3.18 |
| Nitrogen, wt % | 0.32 | 0.26 | 0.25 | 0.20 | 0.26 | 0.26 |
| Vanadium, ppm | 70 | 40 | 38 | 16 | 34 | 30 |
| Conradson Carbon Residue, wt % | 16.00 | 13.55 | 15.46 | 13.5 | 14.53 | 14.21 |
| Asphaltenes, wt % | 8.52 | 5.40 | 5.65 | 3.70 | 8.14 | 4.88 |
| Vanadium Removal, % | — | 38 | 42 | 75 | 48 | 54 |
| CCR Removal, % | 6 | 20 | 9 | 19 | 14 | 16 |
| Sulfur Removal, % | 12 | 36 | 15 | 40 | 24 | 19 |
| Asphaltenes Removal, % | 22 | 51 | 48 | 66 | 26 | 55 |

| CoMo/Al$_2$O$_3$ Resid Demetallization Catalyst Properties | |
|---|---|
| 30–50 | — |
| 50–80 | — |
| 80–100 | 2 |
| 100–150 | 24 |
| 150–200 | 34 |
| 200–300 | 17 |
| 300+ | 12 |

Thermal contributions are determined from a blank run at identical reaction conditions but with no catalyst present.

Table 5 presents the results of this catalyst activity comparison and shows that the supported metal amorphous MAAP catalysts all exhibit demetallization activity superior to those exhibited by the CoMo/Al$_2$O$_3$ catalyst.

Moreover, it can be seen that the CoMo/amorphous MAAP catalyst is also superior to the CoMo/Al$_2$O$_3$ catalyst and asphaltene removal, and sulfur removal (40% vs. 36%). Thus these MAAP catalyst are consistently superior to conventional Al$_2$O$_3$ catalyst for upgrading resids.

Additional experiments were performed and the results of those experiments are set forth in Tables 6 and 7. These tables contain additional resid upgrading activity data for comparison purposes and also demonstrate the importance of particle size upon vanadium removal activity. This phenomenon must be considered when comparing catalyst of different particle sizes.

TABLE 6

Comparison or Resid Upgrading Activities

| Example Identification | 16 Thermal | 17 CoMo/Al$_2$O$_3$ | 18 CoMo/MAAP | 19 C.M./MAAP |
|---|---|---|---|---|
| Catalyst Mesh Size | — | 14–30 | 14–30 | 14–30 |
| Organic Conditions | — | No | No | Yes |
| Temp, °C. | 400 | → | → | → |
| Press., psig | 2000 | → | → | → |
| Oil/Cat | — | 20 | → | → |
| Time, Min. | 80 | → | → | → |
| Total Liquid Product | | | | |
| Hydrogen, wt % | 10.58 | 10.88 | 10.85 | 10.90 |
| Sulfur, wt % | 3.47 | 2.52 | 2.70 | 2.37 |
| Nitrogen, wt % | 0.32 | 0.26 | 0.28 | 0.20 |
| Vanadium, ppm | 70 | 33 | 25 | 16 |
| Conradson Carbon Residue, wt % | 16.00 | 14.44 | 15.28 | 13.5 |
| Asphaltenes, wt % | 8.52 | 5.10 | 5.50 | 3.70 |
| Vanadium Removal, % | — | 49 | 62 | 75 |
| Conradson Carbon Residue Removal, % | 6 | 15 | 10 | 19 |
| Sulfur Removal, % | 12 | 36 | 31 | 40 |
| Asphaltenes Removal, % | 22 | 53 | 50 | 66 |
| Pore Size Dist. of Support % of Pore Volume Dia. (Angstroms) | | | | |
| 0–30 | — | | 0.0 | 0.0 |
| 30–50 | — | | 0.0 | 0.5 |

TABLE 6-continued

| | Comparison or Resid Upgrading Activities | | | |
|---|---|---|---|---|
| 50–100 | — | | 2.5 | 4.8 |
| 100–150 | — | | 7.4 | 12.5 |
| 150–200 | — | | 12.8 | 17.6 |
| 200–400 | — | | 61.6 | 59.4 |
| 400–600 | — | | 15.7 | 5.3 |
| Surface Area, m²/g | — | | 131 | 158 |

| Example | 20 | 21 | 22 | 23 |
|---|---|---|---|---|
| Identification | CoMo/MAAP | CoMo/Al₂O₃ | Mo/MAAP | CoMo/MAAP |
| Catalyst Mesh Size | 8–20 | 8–20 | 14–30 | 14–30 |
| Organic | Yes | No | Yes | No |
| Conditions | | | | |
| Temp, °C. | 400 | → | → | → |
| Press., psig | 2000 | → | → | → |
| Oil/Cat | 20 | → | → | → |
| Time, Min. | 80 | → | → | → |
| Total Liquid Product | | | | |
| Hydrogen, wt % | 10.93 | 11.03 | 10.75 | 10.1 |
| Sulfur, wt % | 2.85 | 3.18 | 3.48 | 3.09 |
| Nitrogen, wt % | — | 0.26 | 0.25 | 0.29 |
| Vanadium, ppm | 27 | 30 | 38 | 42 |
| Conradson Carbon Residue, wt % | 14.52 | 14.21 | 15.46 | 16.50 |
| Asphaltenes, wt % | 6.65 | 4.88 | 5.65 | 4.69 |
| Vanadium Removal, % | 58 | 54 | 42 | 35 |
| Conradson Carbon Residue Removal, % | 14 | 16 | 9 | 3 |
| Sulfur Removal, % | 27 | 19 | 15 | 21 |
| Asphaltenes Removal, % | 39 | 55 | 48 | 57 |
| Pore Size Dist. of Support % of Pore Volume Dia. (Angstroms) | | | | |
| 0–30 | 0.1 | 0.0 | 0.8 | 0.9 |
| 30–50 | 0.1 | 0.0 | 1.5 | 3.8 |
| 50–100 | 1.7 | 2.5 | 6.3 | 11.1 |
| 100–150 | 4.4 | 7.4 | 11.4 | 12.1 |
| 150–200 | 4.6 | 12.8 | 15.3 | 11.4 |
| 200–400 | 35.3 | 61.6 | 62.2 | 37.4 |
| 400–600 | 53.8 | 15.7 | 2.5 | 23.3 |
| Surface Area, m²/g | 108 | 131 | 156 | 190 |

TABLE 7

Resid Upgrading Performance of CoMo/Al₂O₃:Effect of Particle Size
(750° F., 2000 psig H₂, 80 minutes)
(65 ppm V, 3.93 wt % S, 16.96 wt % CCR, 10.93 wt % Asphaltenes)

| Mesh Size | 1/32″ | 14–30 | 20–24 | 35–48 | 48–150 |
|---|---|---|---|---|---|
| Log mean diameter, in. | 0.03125 | 0.033 | 0.030 | 0.014 | 0.007 |
| % Removal | | | | | |
| Vanadium | 38 | 49 | 49 | 63 | 68 |
| Asphaltenes | 51 | — | 53 | 54 | 63 |
| CCR | 20 | 15 | 15 | 17 | 16 |
| Sulfur | 36 | 36 | 36 | 35 | 35 |

For example, when comparing the catalyst in Examples 18 and 20 of Table 6, the demetallization activities for the catalyst are similar (62 and 58% vanadium removal, respectively). However, the particle size of the catalyst prepared from the organically-modified support is much larger than the base case and therefore is a superior catalyst based upon the known particle size effect.

Furthermore, the superiority of an organically modified MAAP compared to one prepared according to the prior art is easily seen when Examples 18 and 23 are compared with Example 19. The catalysts prepared with MAAP without organics remove 62% and 35% vanadium compared to 75% for the organically modified material.

Because of the high pressures required for resid hydroprocessing, it is desirable from an economic standpoint to minimize reactor volume. Use of these amorphous MAAP catalysts for upgrading resids will allow a refiner to attain degree of metals, sulfur and coke precursor removal with less catalyst and therefore in a smaller reactor. Alternatively, using these MAAP catalysts in existing reactors will allow the refiner to run at lower reaction severities or to attain process resids with improved quality. The subject process is particularly attractive for FCC feed pre-treatment. Also, the present invention teaches the ability to tailor pore size distribution, and the large pore volume (greater than 0.8cc per gram) permits high metals capacity thereby increasing catalyst life.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. For example, the catalyst support can include a known zeolitic-type material using conventional extrusion and tabletting procedures or including precipitation of magnesia-alumina-aluminum phosphates in a suspension of zeolites from about 2 to about 75 weight percent.

We claim:

1. A process for upgrading a petroleum residua feedstock which comprises contacting said feedstock under hydrotreating conditions with hydrogen and a catalyst composition comprising a catalytic metal component and a support comprising an amorphous magnesia-alumina-aluminum phosphate prepared by:
(a) forming an aqueous solution of aluminum, magnesium and phosphoric acid;
(b) precipitating amorphous magnesia-alumina-aluminum phosphate by the addition of ammonia to the solution in the presence of a source of organic cation having a size equal to or larger than 2 Angstroms;
(c) separating the precipitate; and
(d) calcining the precipitate.

2. The process of claim 1 wherein the organic cation of preparation step (b) is di-, tri- or tetraalkylammonium or di-, tri- or tetraalkylphosphonium.

3. The process of claim 2 wherein alkyl is selected from the group consisting of methyl, ethyl, propyl and butyl.

4. The process of claim 1 wherein said catalytic metal component comprises a Group VIII metal.

5. The process of claim 1 wherein said catalyst composition also comprises a zeolite.

6. The process of claim 1 wherein the organic cation of preparation step (b) is an amine derivative.

7. The process of claim 6 wherein the amine is an alkylamine.

8. The process of claim 7 wherein alkyl is selected from the group consisting of methyl, ethyl, propyl and butyl.

9. The process of claim 1 wherein said catalytic metal component comprises one or more metals selected from the group consisting of cobalt, nickel, molybdenum and tungsten.

10. The process of claim 4 wherein said catalytic metal component further comprises molybdenum or tungsten.

11. The process of claim 1 wherein said support is characterized after calcination by a surface area of from about 100 m$^2$/g to about 350 m$^2$/g, a pore volume of from about 0.3 cc/g to about 1.5 cc/g, and an average pore radius of from about 10 Angstroms to about 200 Angstroms.

12. The process of claim 11 wherein said support is characterized after calcination by a surface area of from about 125 m$^2$/g to about 250 m$^2$/g, a pore volume of from about 0.7 cc/g to about 1.2 cc/g, and an average pore radius of from about 75 Angstroms to about 150 Angstroms.

13. The process of claim 1 wherein said support comprises magnesia, alumina and aluminum phosphate in the mole ratio of from about 10:80:10 to about 25:10:65.

14. The process of claim 13 wherein said mole ratio is from about 10:55:35 to about 20:35:45.

15. The process of claim 1 wherein said hydrotreating conditions include a hydrogen partial pressure of greater than about 400 psig, a temperature of from about 675° F. to about 850° F. and a liquid hourly space velocity of from about 0.1 hr$^{-1}$ to about 10 hr$^{-1}$.

16. A process for upgrading a petroleum residua feedstock which comprises contacting said feedstock under hydrotreating conditions including a hydrogen partial pressure of greater than about 400 psig, a temperature of from about 675° F. to about 850° F. and a liquid hourly space velocity of from about 0.1 hr$^{-1}$ to about 10 hr$^{-1}$ with hydrogen and a catalyst composition comprising a catalytic metal component and a support comprising an amorphous magnesia-alumina-aluminum phosphate prepared by:
(a) forming an aqueous solution of aluminum, magnesium and phosphoric acid;
(b) precipitating amorphous magnesia-alumina-aluminum phosphate by the addition of an organic amine or quaternary ammonium hydroxide to the solution;
(c) separating the precipiate; and
(d) calcining the precipitate.

17. The process of claim 16 wherein the amine of preparation step (b) is an alkylamine and the quaternary ammonium hydroxide is tetramethylammonium, tetraethylammonium, tetrapropylammonium or tetrabutylammonium hydroxide.

18. The process of claim 16 wherein said catalytic metal component comprises a Group VIII metal.

19. The process of claim 16 wherein said catalyst composition also comprises a zeolite.

20. The process of claim 16 wherein said catalyst metal component comprises one or more metals selected from the group consisting of cobalt, nickel, molybdenum and tungsten.

* * * * *

UNITED STATES PATENT AND TRADEMARK OFFICE
CERTIFICATE OF CORRECTION

PATENT NO. : 4,834,869
DATED : May 30, 1989
INVENTOR(S) : P.J. Angevine et al.

It is certified that error appears in the above-identified patent and that said Letters Patent is hereby corrected as shown below:

Col. 3, line 38    "magensia" should be --magnesia--
Col. 4, line 38    "magensia'" should be --magnesia--
Col. 4, line 49    "800°20F" should be --800°F--
Col. 4, line 43    "incorportation" should be --incorporation--
Col. 8, Table 2, line 14    "P$_2$P$_3$" should be --P$_2$O$_3$--

Signed and Sealed this

Tenth Day of April, 1990

Attest:

HARRY F. MANBECK, JR.

*Attesting Officer*   *Commissioner of Patents and Trademarks*